US012557805B2

(12) United States Patent  (10) Patent No.: US 12,557,805 B2
Howland  (45) Date of Patent: Feb. 24, 2026

(54) MOTION-ACTIVATED ANIMAL REPELLING DEVICE AND KIT

(71) Applicant: Craig Howland, Laconia, NH (US)

(72) Inventor: Craig Howland, Laconia, NH (US)

( * ) Notice: Subject to any disclaimer, the term of this patent is extended or adjusted under 35 U.S.C. 154(b) by 0 days.

(21) Appl. No.: 17/991,759

(22) Filed: Nov. 21, 2022

(65) Prior Publication Data

US 2023/0157272 A1 May 25, 2023

Related U.S. Application Data

(60) Provisional application No. 63/281,216, filed on Nov. 19, 2021.

(51) Int. Cl.
| *A01M 29/32* | (2011.01) |
| *B05B 12/12* | (2006.01) |
| *B05B 15/68* | (2018.01) |

(52) U.S. Cl.
CPC ........... *A01M 29/32* (2013.01); *B05B 12/122* (2013.01); *B05B 15/68* (2018.02)

(58) Field of Classification Search
CPC ....... A01M 29/00; A01M 29/30; A01M 29/32
See application file for complete search history.

(56) References Cited

U.S. PATENT DOCUMENTS

| 4,185,581 A | * | 1/1980 | Tilton | ................... A01M 29/00 |
| | | | | 116/22 A |
| 5,009,192 A | * | 4/1991 | Burman | ................ A01M 29/30 |
| | | | | 239/69 |

| 5,602,799 A | * | 2/1997 | Hecker | ................. A01M 29/30 |
| | | | | 367/139 |
| 5,878,956 A | * | 3/1999 | Djukastein | ............ B05B 12/122 |
| | | | | 446/175 |
| 6,373,385 B1 | * | 4/2002 | Wheeler | ............... A01M 29/30 |
| | | | | 222/61 |
| 7,462,364 B2 | * | 12/2008 | Bell | .................... A01M 31/002 |
| | | | | 424/405 |
| 7,690,146 B2 | * | 4/2010 | Jong | ..................... A01M 29/30 |
| | | | | 116/22 A |
| 8,904,968 B1 | * | 12/2014 | Nelson | ............... A01M 31/002 |
| | | | | 119/720 |
| 9,044,770 B1 | * | 6/2015 | Eyring | ................. A01M 29/30 |
| 9,204,622 B2 | * | 12/2015 | Wong | .................... A01M 29/12 |

(Continued)

FOREIGN PATENT DOCUMENTS

| CN | 111729117 A | * | 10/2020 | |
| DE | 202004003959 U1 | * | 8/2004 | ............ A01M 29/30 |

(Continued)

*Primary Examiner* — Magdalena Topolski

(74) *Attorney, Agent, or Firm* — McLane Middleton, Professional Association

(57) ABSTRACT

A system for repelling animals that includes a spraying device, a water pump, a motion detector, and a power source. The system will cause the spraying device to spray water when the motion detector detects motion. The inclusion of the water pump allows the system to be used on boats that are at sea or in other situations where a pressurized water source is not readily available. The system may include means for changing a direction of the spray of the water, including the directions of both vertical and lateral motion. As such, a specific area to be sprayed may be programmed into the system so that the system will only spray in that area.

24 Claims, 15 Drawing Sheets

(56) References Cited

U.S. PATENT DOCUMENTS

| | | | | |
|---|---|---|---|---|
| 9,226,493 | B2 * | 1/2016 | Garcia | A01M 29/30 |
| 9,242,261 | B2 * | 1/2016 | Rich | B05B 15/70 |
| 9,248,464 | B2 * | 2/2016 | Rich | A01M 29/30 |
| 10,150,130 | B2 * | 12/2018 | Morris | F41H 9/00 |
| 10,420,335 | B2 * | 9/2019 | Kocznar | A01M 29/32 |
| 10,561,077 | B2 * | 2/2020 | Bermudez Rodriguez | A01G 25/165 |
| 11,172,671 | B2 * | 11/2021 | Liu | A01G 25/165 |
| 11,498,224 | B1 * | 11/2022 | Song | G01S 15/88 |
| 11,856,938 | B1 * | 1/2024 | Bart | G05D 1/0094 |
| 2003/0094507 | A1 * | 5/2003 | Anzivino | A01M 29/30 239/70 |
| 2006/0213449 | A1 * | 9/2006 | Dodge | A01M 29/30 119/329 |
| 2014/0326195 | A1 * | 11/2014 | Gitrie | A01M 29/00 119/712 |
| 2022/0250747 | A1 * | 8/2022 | Kominami | B65D 83/262 |

FOREIGN PATENT DOCUMENTS

| | | | | | |
|---|---|---|---|---|---|
| DE | 202004021154 | U1 * | 1/2007 | | A01M 29/24 |
| DE | 202007004244 | U1 * | 7/2007 | | A01M 29/32 |
| KR | 900001703 | Y1 * | 3/1990 | | |
| KR | 102209045 | B1 * | 1/2021 | | |

* cited by examiner

64

28, 32

28, 30

MOTION-ACTIVATED ANIMAL REPELLING DEVICE AND KIT

CLAIM OF PRIORITY

This application claims the benefit of priority of U.S. Provisional Patent Application Ser. No. 63/281,216, filed on Nov. 19, 2021.

FIELD OF THE INVENTION

The present invention relates generally to animal (particularly bird) nuisance prevention, and specifically to a motion-activated spray device.

BACKGROUND

Even an animal lover would admit that animals may be displeasing in certain locations and situations. Some animals, such as rodents that might be disease carrying, are widely considered to be unwelcome pests in almost any setting. Other animals, such as birds or deer, may be generally unobjectionable or even admired in many settings, but disagreeable in others. Entire industries focus on the eradication (of pests) or at least the deterrence or repellence of the presence of animals in some locations. Pest control services and products are an obvious example, but many products also exist for those less objectionable animals, such as birds and deer. Products for keeping birds away from an area include, for examples, pinwheels, fake swans, plastic hawks and owls, wind turbines, strobes, plastic balls that resemble eyes, reflective streamers, twirlers, ultrasonic speakers, kites, wires, and fences. Many of these products are cumbersome, unsightly, and/or unsafe. Netting is also often used for pest control and can be very hazardous for the animals caught therein. Few, if any of these options, work very well.

Other products spray water at unwelcome animals using motion detectors. One such device is a motion-activated animal repellent and sprinkler sold under the trademark "Havahart 5277." This device uses forced water from a spigot and may spray water up to 60 feet upon detection of an animal with an infrared sensor. The device includes a metal spike for placement in a lawn or garden. This device is capable of spraying in a single direction or in an arc only.

Speaking more specifically, ducks and other birds are not welcome on a boat deck. They are obtrusive for any humans who have to share the space. Even when the deck is clear, however, their shed feathers and droppings are messy and can be health hazards, as droppings may be viral and/ bacterial vectors. Devices such as the motion-activated animal repellent and sprinkler are not well suited for use on a boat. There is no lawn on a boat into which the metal spike of the device may be secured. Moreover, a boat does not have the same type of forced water source and spigot that a land-based device enjoys, especially when the boat is mooring away from a docking system. Therefore there is a need for a compact and easily portable, stowable, and/or integrable system to repel birds from boat decks that is safe for the birds and easily integrated into the unique surroundings of a boat.

SUMMARY OF THE INVENTION

The present invention is a system and kit for repelling animals. Although the present invention is particularly well suited to repel ducks and other birds from boat decks, its applicability to other situations will be apparent. As such, the reader should consider references to "animals" and "birds" to be interchangeable throughout. In addition, while boat decks are mentioned throughout, the reader will recognize that the system of the present invention may also be used advantageously on rafts, floating docks, traditional docks, or any other area where it is desirable for animals, such as birds, to be repelled. Discussions herein of the system in relation to boat decks should, therefore, also be considered with relation to such other structures as well, and the term "boat deck" should be considered to be synonymous with any of these or similarly applicable surfaces and structures.

In its most basic form, the system of the present invention includes a spraying device with a nozzle that sprays liquid; a motion detector in communication with the spraying device such that the spraying device is instructed to spray upon the detection of motion by the motion detector; a liquid pump in communication with a source of liquid and with the spraying device such that the liquid pump provides liquid from the source of liquid to the spraying device to be sprayed; and a power source that powers at least the water pump and the motion detector. Although it is understood that any liquid may be sprayed by the spraying device and pumped by the liquid pump, the liquid is most likely water and will be referred to as such henceforth herein. With the basic system, the spraying device produces a spray that may hit any point on a boat deck and the spraying device will spray any time the motion detector detects motion on the boat deck. In this basic system, the motion detector need not be so sophisticated as to indicate exactly where the animal is in relation to the spraying device (although it may be, as discussed below).

In some embodiments, the system is integrated directly into or onto a boat. In such embodiments, the system may be built directly onto a railing, for example. A flat surface on the boat may also serve as a housing for the system, for another example, or the system may be an extension of a boat surface. When the system is not directly integrated into the surface to which it is attached, however, the system also includes a mounting system for securing at least the spraying device to a fixed surface. With such a mounting system, the system of the present invention may be used with any existing boat or retrofitted into any appropriate situation. This non-integrated embodiment of the system that includes a mounting system is portable and/or stowable and may be used on any boat.

In some embodiments, the water pump is disposed directly in or on the source of water. In other embodiments, where the pump is not disposed directly in or on the source of water, the system of the present invention also includes a hose that is attached to the water pump and reaches the source of water. In any of these embodiments, the water pump is in physical communication with the source of water, either directly (when the water pump is disposed directly in or on the source of water) or indirectly (through the hose). In addition, water pump is sometimes connected to the remainder of the system components through a pump connector, such as a hose or tubing, but is sometimes integrated directly into the remainder of the system such that such a pump connector is not necessary. The water pump may also be part of the boat, such as the bilge pump, or be incorporated into a component of the boat.

When possible, depending on the nature of the spraying device, the nozzle of the spraying device may be removably attachable. This may be possible if the spraying device is a sprinkler, for example, as discussed below. Different nozzles may provide sprays having different characteristics that may be tailored to a situation. As discussed below, the kit of the present invention may include several interchangeable nozzles with different spraying characteristics.

In some embodiments, the system also includes means for adjusting a direction of the spray. In such embodiments, the power source may also provide power to these means. In such embodiments, the spraying device may move through a range and spray an entire area upon receiving information from the motion detector that motion has been detected. In more sophisticated embodiments, the spraying device may only spray in the direction where the motion detector has detected motion. In other sophisticated embodiments, the range of motion through which the spraying device may move to spray over an area may be restricted so that the spraying device only sprays a defined area, like the area of a boat deck. This involves means for adjusting a distance that the spray reaches and/or a spread or width of the spray that the spray covers. Adjustment of the spread or width of the spray allows for wider or narrower spray patterns and may be achieved by simple screw adjustments, for example. These additional adjustments allow for additional precision as to where the spray will land. The motion detector used in such embodiments may be more sensitive as to exactly where the motion occurred so that the spraying device will spray in the right direction and to the right distance. Again, these features are not required and this level of precision is not necessary with the basic system where the spraying device will spray the entire boat deck any time that motion is detected.

In one embodiment of the present invention that includes means for adjusting a direction of the spray, these means include at least means for moving at least the nozzle of the spraying device through up to 360° of lateral motion and/or means for moving at least the nozzle of the spraying device through up to 180° of vertical motion. As used herein, lateral motion is parallel to the ground and vertical motion is ±90° perpendicular from the ground. In other words, the 360° of lateral motion allows for swiveling the spraying device through an entire revolution, or side to side. As such, one means for moving at least the nozzle of the spraying device through up to 360° of lateral motion is a lateral actuator, such as an oscillating disc, in mechanical communication with the spraying device such that the actuator can swivel the spraying device in a full circle. The oscillating disc is provided only as one example of the means for moving the nozzle through lateral motion. One of ordinary skill in the art will recognize that there are many other lateral actuators and other means that could accomplish this motion. It is possible that only the nozzle of the spraying device would make this full revolution while the remainder of the spraying device remained stationary, but in one embodiment, the entire spraying device swivels through the lateral motion. The vertical motion, on the other hand, allows the spraying device to spray up and down. One means for moving at least the nozzle of the spraying device through up to 180° of vertical motion is a vertical actuator incorporated into the spraying device so that the nozzle can move up and down. It is possible that the entire spraying device could be moved to achieve the vertical motion, but this is not preferred. In one embodiment of the system, the spraying device is capable of moving through approximately 270° of lateral motion, specifically ±135° from the starting position of the spraying device, and the nozzle is capable of moving through approximately 135° of vertical motion, specifically +45° (up) and −90° (down) from the starting position of the nozzle. As used in this context the "approximate" range of motion means the indicated range ±5°. In other words, "approximately 270°" of lateral motion means 270±5° and "approximately 135°" of vertical motion means 135±5°. The distance that spray travels may be determined by the means for adjusting a direction of the spray, particularly by adjustment of the vertical angle. The distance that spray travels may also be determined by means for adjusting the force with which the spray is sprayed. Some embodiments of the system include both means for adjusting a direction of the spray and means for adjusting the force with which the spray is sprayed.

The spraying device may simply be a nozzle at the end of a hose or tube, but may be a squirt gun or a sprinkler or any other component commonly used in the art to spray water. When the spraying device is a squirt gun, the nozzle of the spraying device is the barrel of the gun. When the spraying device is a sprinkler, the nozzle of the spraying device is a sprinkler head. As indicated by the background, the original intent of the system was to repel ducks and other birds from boat decks. The idea is, therefore, for the spray to be able to cover a very specific area. It need not go further than the area of the boat deck. With the means for adjusting the direction of the spray combined with the means for adjusting a distance and/or width of the coverage area of the spray, a more specific area may be defined. When the spraying device is a squirt gun, the means for adjusting the direction of the spray may simply be a rotating plate or oscillating disc on which the squirt gun is mounted. When the spraying device is a sprinkler, the means for adjusting the direction of the spray may be an oscillating sprinkler head. Although squirt guns and sprinkler heads have been exemplified above, one of ordinary skill in the art will understand that many spraying devices may be used successfully with the present invention and each of these is considered to be within the scope of the present invention.

The spraying device may also include means for adjusting a force or pressure of the spray and/or means for allowing pulsation of the spray and frequency and force of the pulsation. In fact, the means for adjusting the distance of the spray are likely means for adjusting the force of the spray. If more force is applied to the spray, then the spray will travel farther. The means for adjusting the force of the spray are also included to adjust for different birds and bird behavior. For smaller birds, for example, a lighter spray may be sufficient to repel their presence. Larger birds may require stronger force. The force may therefore be dependent on the bird or animal type and/or its location. In addition, increasing the pressure of the spray may be more effective at repelling that bird. If included, the means for allowing pulsation of the spray allow the spray to be adjusted between a continuous stream versus repeated pulses of spray. If pulsation is chosen, the cadence of the pulses and pressure thereof may also be programmed. Again, it may be that certain ducks are more repelled by a quick burst of pulses of spray versus a continuous stream or vice versa. This feature allows for accommodation of either.

A system, for example, may have a spraying device that may swivel to be able to spray in any direction, in 360°, and may be set to spray no farther than 3 feet in any direction. Any ducks that strayed into the circular area around the spraying device, therefore, would be repelled. As discussed below, some embodiments of the present invention also allow the system to be programmed to spray only a specific area or pattern. For most boats, however, such placement of the spraying device would not be convenient. In a more likely scenario, the spraying device may be mounted on rails at the stern of the boat or otherwise integrated into the stern or bow. The spraying device need then only oscillate in 180°. If the boat is 20 feet long, for example, the system could be programmed to spray 20 feet when the nozzle is directed at 90°; 16 feet when the nozzle is directed at 75° or 105°; 12 feet when the nozzle is directed at 60° or 120°; 8 feet when the nozzle is directed at 45° or 135°; and 6 feet when the nozzle is directed at 20° or 160°. This would roughly define the area of the boat. Alternatively, in the basic system, the spraying device would produce a spray that goes far enough and is wide enough to cover the entire boat deck so that the spraying device need not move at all when motion is detected.

The motion detector is in communication with the spraying device so that when motion is detected, the spraying device is instructed to spray. The motion detector may be disposed on or near the spraying device, but it may also be positioned anywhere where it is able to detect motion on the boat deck or other area to be sprayed.

In some more sophisticated embodiments of the present invention, the motion detector may instruct the spraying device to spray specifically in the direction in which the motion was detected. As used herein, the "eye" of the motion detector is the portion of the motion detector that actually detects or "sees" motion. The spraying device and the eye of the motion detector are pointed generally in the same direction. That is to say, if the eye sees motion at 60°, the spraying device would be instructed to spray in the direction of 60°. When the motion detector is located separately from the spraying device, the instruction on where to spray may just be a little more complicated. If the motion detector is located one foot to the left of the spraying device, for example, and the motion detector sees motion directly in front of the motion detector, then the spraying device would need to adjust its direction to the left. The computation becomes more difficult as far as distance. If the motion is one foot in front of the motion detector, then the spraying device would need to spray in the direction of 135°. If the motion is 10 feet in front of the motion detector, then the spraying device would need to spray in the direction of approximately 95°. If the motion detector can also determine distance of the motion and the relative locations of the spraying device and the motion detector are fixed, then programming to account for the different locations may be implemented. Regardless, co-location is preferred for simplicity. The motion detector may be any commonly used in the art, such as an infrared detector and may represent a single motion detector or two or more motion detectors.

The water pump of the system of the present invention will draw upon a reservoir of water. When the present invention is used on a boat or raft, the reservoir is the very water one which the boat or raft floats. The water pump provides the necessary pressure system to draw the water from the reservoir and spray it through the spraying device. The hose of the water pump needs to be long enough to reach the reservoir. The length of the hose will depend on the distance between the water pump and the reservoir and may be cut to a desired length. When the system of the present invention is used on a boat, the distance between the water pump and the reservoir may be the freeboard of the boat. As explained below, the kit of the present invention may include several hoses of different lengths to accommodate boats with different freeboards. The one or more hoses included in the kit may be cut down to a desired length. The water pump will pump water from the reservoir and supply it to the spraying device as needed. As such, no water tank would be required for the present invention. In some configurations, the water pump may sit directly in the reservoir, so that a hose is not required from the reservoir to the pump. The water pump is a key differentiator over prior art systems for repelling animals, such as that sold under the trademark "Havahart 5277" and discussed above. The water pump underscores the function of the present invention on a boat, where the very water on which the boat floats, is the water that is sprayed at the animals. Systems such as that sold under the trademark "Havahart 5277" are hooked up to a land-based house's water source which provides water pressure and therefore do not require a water pump. The pressure from the house's water source is sufficient. The present invention, and its inclusion of a water pump, allow for spraying water at animals in the absence of such a built-in pressurized water source.

The mounting system of the system may be any commonly used in the art. As many quality mounting systems are commercially available, the mounting system of the present invention is simply means for attaching one of these existing systems. Many of these existing mounting systems, such as those specified below, come with attachment hardware or other means for attaching the mounting system, so there is no need to include a mounting system with the present system. In some embodiments, however, a mounting system is included, as described below. The mounting system may be clamps that can hold the spraying device securely in place on rails. It may be bolt holes on a component or components of the system and bolts to anchor the system to a surface. It may be straps with hook and loop attachments, again for securing to rails or other objects. In one embodiment of the mounting system for securing the system of the present invention to a flat surface, the mounting system is that sold under the trademarks MAGMA LEVELOCK all-angle fish rod holder mount or double locking fish rod holder mount or similar products. In one embodiment of the mounting system for securing the system of the present invention to a round railing, the mounting system is that sold under the trademark MAGMA single horizontal round rail mount or MAGMA MARINE KETTLE round rail mount or similar products. In one embodiment of the mounting system for securing the system of the present invention to a rectangular railing, the mounting system is that sold under the trademark MAGMA square rail mount or bulkhead or square/flat rail mount or similar products. Some embodiments of the mounting system are adapted for mounting the system of the present invention to a fishing rod holder. Whatever the mounting system is, it is preferred that it not scratch or otherwise damage that to which it is mounted. One of at least ordinary skill in the art will recognize that there are many ways that the system may be mounted and each of these is contemplated as being within the scope of the present invention. The inclusion of some version of a mounting system is recommended, however, as the spraying device is envisioned for use on a moving object and therefore must be secured in place.

A basic system of the present invention may be plugged into a power outlet in order to power the spraying device, the water pump, the motion detector, or any combination thereof. If the system is used on a boat, the system may be plugged into the boat so as to use the boat's power source, which is likely a battery, as a power source for the system as well. In this case, the "power source" that is included in the system is the power cord that is adapted to mate with a remote power that is the boat's power source. Although it is understood that a power cord is not a power source on its own, for the purposes of the present invention, it is considered to be a power source because it can be mated with a more traditional remote power source, such as the boat's power source, the electrical grid through a standard power outlet, or a generator. The power source may also be a battery, such as a corrosion-resistant battery that may be safely used in a salty environment, one or more solar panels, a generator, or a combination of any of these.

When the power source is a battery, the battery may be rechargeable and the system would further include a charge cord adapted to connect the rechargeable battery with a remote power source that would recharge the battery upon connection. An example of the charge cord would be a cord that may be plugged into the rechargeable battery on one end and plugged into a standard electric socket on the other end. Typically, solar panels are only included in systems of the present invention that also include a rechargeable battery and the power generated by the solar panel is directed to recharge the battery rather than to power the system components directly. In some embodiments, however, where the solar panel is able to generate sufficient power to power all of the system's components, a solar panel may be the only power source for the system.

The battery may be a lead acid battery. When a solar panel is included as a power source, the power source may also include a battery. In this embodiment, the solar panel is wired directly to the battery and in parallel with the battery and the rest of the circuit. One of at least ordinary skill in the art will recognize that any battery may be used successfully with the present invention and any battery management system and solar panel connection may be incorporated.

Other power sources may include, non-inclusively, a kinetic motion charger, a windmill charger, or a paddle charger deployed in the water. Such chargers use natural elements to either directly charge the system of the present invention or provide trickle charging to a battery of the system or the boat battery.

The power source may be directly integrated into the spraying device, water pump, and/or motion detector or may be a separated component connected to one or more by power cords. The water pump, spraying device, and motion detector may each have their own power sources. In some embodiments, however, a power source is not included with the system and external sources of power must be relied upon. A system that does not include its own power source may be plugged into a power outlet, for example, or connected to a separate solar array. It is understood that when the system is integrated directly into the boat, the system may share the boat's power source and any wiring or cords may be internal and not visible from the boat deck.

The system may include means for programming the hours of operation of the spraying device. The user may only want the repellent at night, for example.

The system may include a control unit including controls for the various features that may be included in the system. The control unit controls at least a power cycle control of the system. In other words, the control unit controls turning the system on and off. The power cycle control may include a timer so that hours of operation of the system may be programmed and preset. When the power source of the system is a battery, as discussed above, some embodiments may include a battery level detector that detects a power level of the battery and has a function to turn off the system when the battery power level is less than a designated level. With a rechargeable battery, the battery may then be recharged. As another example, if the power source is a boat's battery, then the battery level detector will ensure that the system of the present invention does not drain the boat's battery to a level that that boat battery cannot perform other essential functions, such as the bilge pump. As discussed below with reference to the kit of the present invention, the battery level detector may be included in the kit to be used to monitor the level of the boat's battery. In some embodiments, the system includes a remote control that controls the control unit remotely. The control unit may also include controls for, without limitation, the distance that the spraying device will spray water; the width of the spray; whether pulsation of the spray is used and its frequency and intensity if used; force/pressure of the spray; and hours of operation of the system. The control unit may also include controls for the distance that the spraying device will spray water as a function of direction of the spray. This control will allow the user to essentially program in the area of his boat, i.e., the area from which he wants ducks to be repelled by the system. The necessary pressure to reach the desired distances would also be programmed or otherwise automated.

In some embodiments, some of the components of the system are disposed in a housing. In one embodiment, most of the spraying device is housed within the housing, but the nozzle extends out of the housing. The nozzle need not extend very far out of the housing and, in fact, may be practically flush with the housing. The nozzle only needs to be able to spray out of the housing, so it may be positioned flush with the housing or extending out to any desirable extent. When the power source is a battery, the battery may be disposed within the housing. As the system of the present invention is envisioned as possibly being used on a boat at sea, the housing is particularly important to protect the system's components from the elements, such as salt water. In one embodiment, the system includes a base where the motion detector is positioned and the housing extends up from this base, housing at least the battery and most of the spraying device, with the nozzle of the spraying device external from the housing. As used herein, when it is said that the nozzle is "external from the housing" or "extends outside of the housing," it is understood that the nozzle may not extend very far out of the housing and may, in fact, be flush with the housing. In this embodiment, actuators for moving the spraying device through the lateral motion and for moving the nozzle through the vertical motion (means for moving the spraying device through some amount of lateral motion and means for moving the nozzle through some amount of vertical motion, respectively) are also disposed within the housing. In one embodiment, the housing is round with a slot through which the nozzle of the spraying device extends, where the slot allows for the vertical motion of the nozzle. In other embodiments, the housing does not include a slot to allow for motion of the nozzle. Instead, the entire housing would move both laterally and vertically, as needed. Omitting the slot ensures that bees, insects, and other undesirables cannot get inside of the housing. In some embodiments, the housing may include graphics of eyeballs or other patterns that may frighten animals from coming near the system and/or other protrusions to discourage animals from landing on the system. It is understood that the round housing is presented as one example, but the housing may be of any size or shape.

In another embodiment, the housing would contain the water pump and a power source. The spraying device would extend out from the housing. The hose would extend out of the bottom of the housing. The motion detector may be disposed on the outside of the housing next to the spraying device or may have only its eye disposed on the outside of the housing next to the spraying device while the rest of its body is housed in the housing. The control unit may be disposed on the outside of the housing for easy user access. Alternatively, the housing may be openable and the control unit may be disposed within the housing so as to protect the electronic components from the elements. In embodiments that do not include a power source, an electric cord could extend out of the housing to be connected to an external power source, such as an outlet, a solar panel, a generator, or a battery. A solar panel may be included on the outside of the housing or otherwise wired to the battery, as discussed above. The mounting system, if included, would be disposed on the outside of the housing and the housing may make the system more easily mountable than if it were the several components connected to one another without a housing.

In its most basic form, the kit of the present invention includes a system for repelling animals where the hose is removably detachable, and several hoses of different lengths so that one system may be used on boats having several different freeboards or so one or more hoses may cut to a desired length. If the system includes a spraying device with a removably detachable nozzle, the kit may also include several different types of nozzles that cause different spray characteristics. The kit may also include a power source. As discussed above, the kit may also include a battery level detector that may be used on a boat battery.

Another embodiment of the system of the present invention does not necessarily require the water pump. So as to distinguish this variation of the system from the system described above, this embodiment of the system will be referred to as the "variation" and the system described above will continue to be referred to as the "system." In its most basic form, the variation includes a spraying device (as discussed above with respect to the system) in mechanical communication with a pressurized system of water; a motion detector (also as discussed above with respect to the system); means for adjusting a direction of the spray, wherein the means for adjusting a direction of the spray include means for lateral and vertical motion; a programmable control unit that controls at least a range of the direction of the spray; and at least one power source in electrical communication with at least the control unit. The pressurized system of water may or may not be part of the overall system. The pressurized system of water may, for example, be the water pump, as discussed above with respect to the system, in which case the pressurized system of water would be part of the variation. The pressurized system may, for another example, be an outdoor spigot, in which case the pressurized system would not be part of the variation.

The variation is particularly suited for applications where it is desired that only a specific area is within range of the spray. The programmable control unit allows this range to be programmed into the control unit. In other words, a range of lateral motion is input into the control unit so that the spray can only spray from left to right within that range. Similarly, a range of vertical motion is input into the control unit so that the spray can only spray a distance within the set range. As discussed above, adjustments in vertical motion may affect the distance that the spray travels. By inputting the range of vertical and lateral motion, any area may be programmed as the area to be sprayed. The area may be circular, rectangular, the shape of a boat, or any other shape. The range may be programmed to follow the exact path of the designated area. It is understood that this feature of being able to program in the area to be sprayed may be incorporated into any embodiment of the system or the variation.

The spraying will only occur within the programmed area. The spraying may occur only in the direction of the detected motion or the spraying may cover the entire programmed area any time motion is detected within the programmed area. In some embodiments, only a subsection of the programmed area is sprayed. For example, if the motion detector includes three motion detectors facing toward different sections of the programmed area, and motion is only detected by one motion detector, then only the subsection of the area in front of that motion detector that detected motion may be sprayed. In other words, in some embodiments, a subsection of the entire area is programmed to correspond with each of the motion detectors. In such embodiments, the entire area may also be programmed and the user would have the option to have the entire programmed area sprayed if motion is detected by any motion detector or to have only the subsection of the area corresponding to the motion detector that detected motion sprayed.

The specific dimensional patterns that the system and the variation can target is a key differentiator over prior art systems for repelling animals, such as that sold under the trademark "Havahart 5277" and discussed above. The means to target a specific area or pattern underscores the function of the present invention on a boat, where the specified target area can be defined sprayed at the animals. Systems such as that sold under the trademark "Havahart 5277" have a circular spray pattern. The present invention, and its inclusion of a means to target a specific area or pattern, allow for spraying water at animals without spraying water on surrounding surfaces.

One of at least ordinary skill in the art will recognize that many of the features described above with respect to the system are equally applicable to the variation. The addition of each of these features to the variation is considered to be within the scope of the present invention.

Therefore it is an aspect of the present invention to provide a system for repelling animals that includes a spraying device that sprays water from a nozzle; a motion detector in communication with the spraying device such that the spraying device will spray water when motion is detected; and a water pump that pumps water to be sprayed to the spraying device; a hose with a first end connected to the water pump and a second end that reaches a source of the water to be sprayed; and a power source that powers at least the water pump.

It is a further aspect of the present invention to include a mounting system for mounting at least the spraying device onto a fixed surface, such as a flat surface or a round or rectangular railing or a fishing rod holder.

It is a further aspect of the present invention to be integrated directly into a boat or other craft.

It is a further aspect of the present invention that the spraying device include means for adjusting a direction of the spray, the distance of the spray, and/or the width of the spray.

It is a further aspect of the present invention that the means for adjusting the direction of the spray include means for moving at least the nozzle of the spraying device for up to 360° of lateral motion and up to 180° of vertical motion.

It is a further aspect of the present invention that the means for adjusting the direction of the spray include means for moving at least the nozzle of the spraying device for approximately 270° of lateral motion and approximately 135° of vertical motion.

It is a further aspect of the present invention that the means for adjusting the direction of the spray through approximately 135° of vertical motion includes moving the nozzle up approximately 45° and down approximately 90°.

It is a further aspect of the present invention that the means for adjusting the direction of the spray include at least lateral and vertical actuators.

It is a further aspect of the present invention that the spraying device include means for adjusting the force of the spray emitted by the nozzle of the spraying device.

It is a further aspect of the present invention that the spraying device include means for providing a pulsating stream and means for adjusting the frequency and pressure of the pulsation.

It is a further aspect of the present invention that the nozzle of the spraying device is an oscillating nozzle and that the means for adjusting the direction of the spray is the oscillation of the oscillating nozzle.

It is a further aspect of the present invention that the spraying device be mounted on an oscillating disc and the means for adjusting the direction of the spray is the oscillating disc.

It is a further aspect of the present invention that the nozzle of the spraying device is removably attachable.

It is a further aspect of the present invention that several removably attachable nozzles that produce water sprays with varying aspects are included.

It is a further aspect of the present invention that the power source also power the spraying device, the motion detector, the means for adjusting a direction of the spray, or a combination thereof.

It is a further aspect of the present invention that the power source be a battery, such as the battery of a boat on which the system is mounted or into which the system is integrated.

It is a further aspect of the present invention that the power source be a corrosion-resistant battery.

It is a further aspect of the present invention that the battery be rechargeable and the system include a charge cord adapted to recharge the battery.

It is a further aspect of the present invention that the power source be at least one solar panel.

It is a further aspect of the present invention that the power source be a power cord that may access a remote power source, such as the power grid or the boat's power source (such as the boat's battery).

It is a further aspect of the present invention that the power source be a generator.

It is a further aspect of the present invention that the power source be a combination of a battery, solar panel, and/or power cord.

It is a further aspect of the present invention that the motion detector be an infrared detector.

It is a further aspect of the present invention that the power source be integrated with the spraying device and connections to any other components that the power source powers, such as the water pump, control unit, and/or motion detector.

It is a further aspect of the present invention that the mounting system include clamps.

It is a further aspect of the present invention that the mounting system include hook and loop attachments.

It is a further aspect of the present invention to include a timer or other means for programming hours of operation of the system.

It is a further aspect of the present invention to include a control unit for controlling certain functions of the system, such as distance that the spray will reach; distance that the spray will reach as a function of the direction in which the nozzle of the spraying device is pointed; pressure of the spray; pulsation of the spray; and hours of operation of the system.

It is a further aspect of the present invention that the control unit include a power cycle control for turning the system on and off.

It is a further aspect of the present invention to include a remote control for controlling the control unit remotely.

It is a further aspect of the present invention to include a housing for the several components of the system.

It is a further aspect of the present invention to provide a round housing with a slit through which the nozzle of the spraying device extends.

It is a further aspect of the present invention to provide a kit with several hoses of different lengths or a hose that can be cut to a shorter length.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1A:
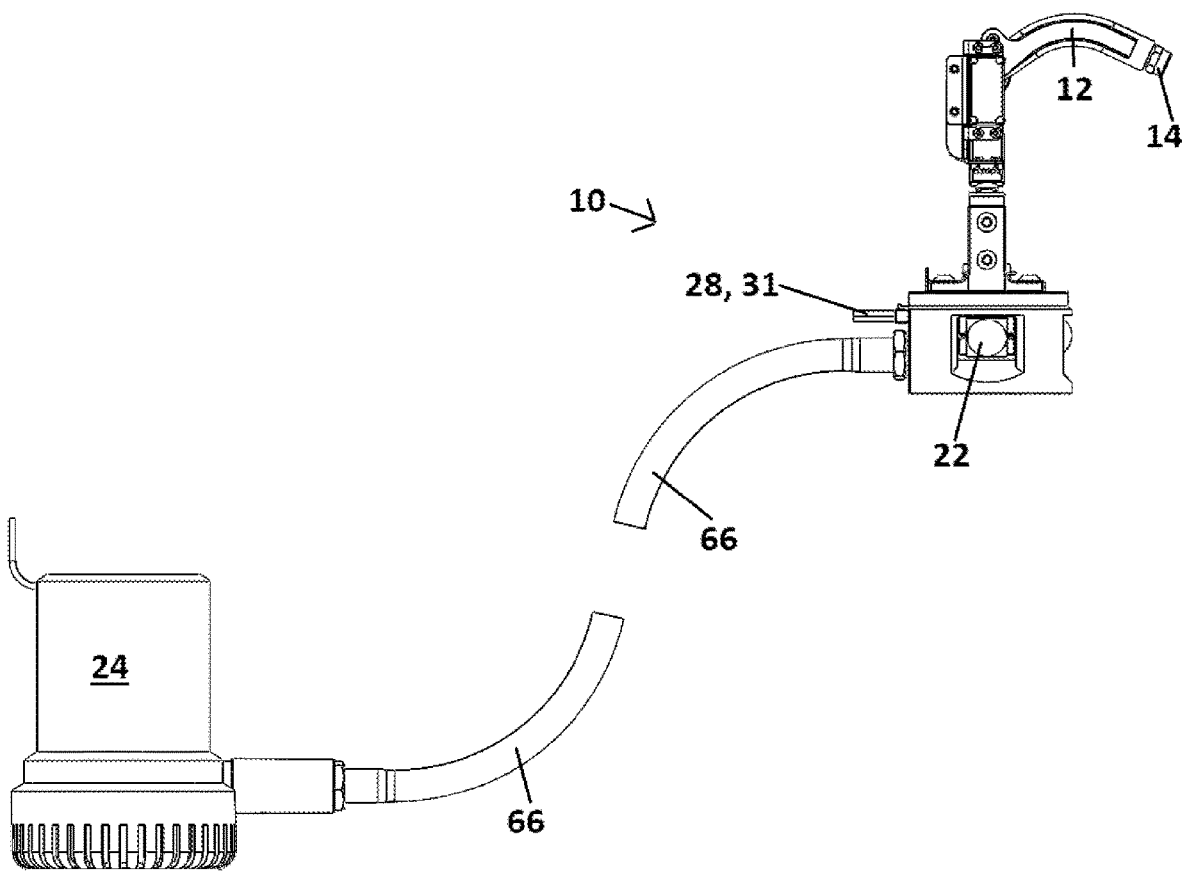
FIG. 1A is a diagram of an embodiment of the system of the present invention that does not include a housing; and does include a hose; and where a submersible pump is at the end of the hose.

Referring first to FIG. 1A, a diagram of system 10 of the present invention is provided. System 10 includes spraying device 12 with nozzle 14 from which water is sprayed. Water pump 24 is in mechanical communication with spraying device 12 such that water pump 24 pumps water to be sprayed to spraying device 12. This mechanical communication is facilitated by pump connector 66, which is shown broken to indicate that there may be any reasonable length of pump connector 66 between water pump 24 and spraying device 12. In this embodiment, it is understood that water pump 24 is sitting directly on or in the source of water that is pumped to spraying device 12. Although pump connector 66 is shown connecting water pump 24 to the other components of system 10, it is understood that water pump 24 may incorporated directly into housing 64 (as shown in, e.g., in FIGS. 2B and 2C) or base 53 or as otherwise configured such that pump connector 66 would not be necessary or be so short as to be negligible. System 10 also includes motion detector(s) 22 that detects motion. Motion detector 22 is in communication with spraying device 12 such that, when motion detector 22 detects motion, spraying device 12 sprays water from nozzle 14. In some embodiments, spraying device 12 only sprays in a direction of the detected motion. System 10 also has power source 28, which is power cord 31 in this embodiment. Power cord 31 is adapted to mate with a remote power that is external from system 10, such as the electric grid or a boat's battery. It is understood that the diagrams shown are not necessarily to scale.

Figure 1B:
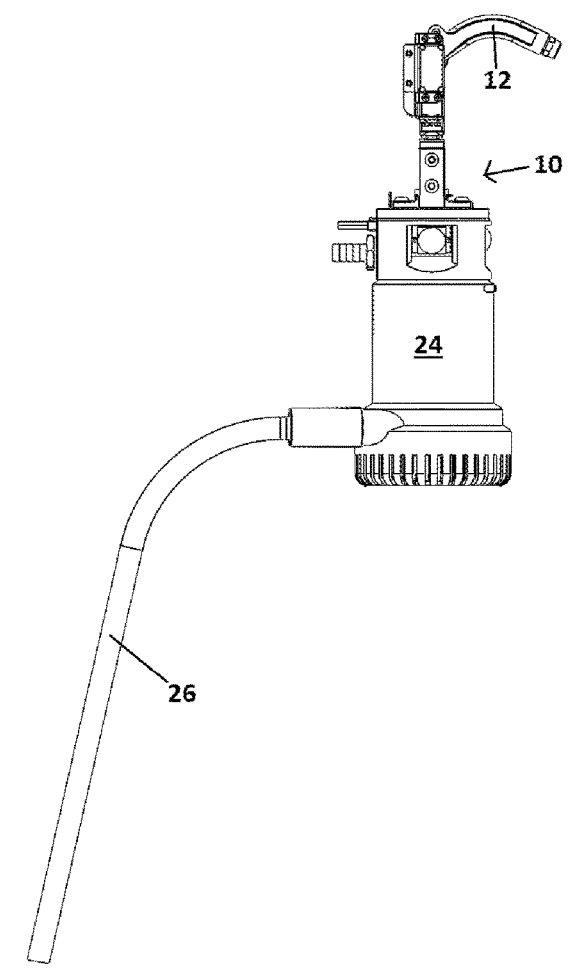
FIG. 1B is a diagram of an embodiment of the system of the present invention that does not include a housing; does include a hose; and where the water pump is integrated directly with the spraying device.
Figure 4:
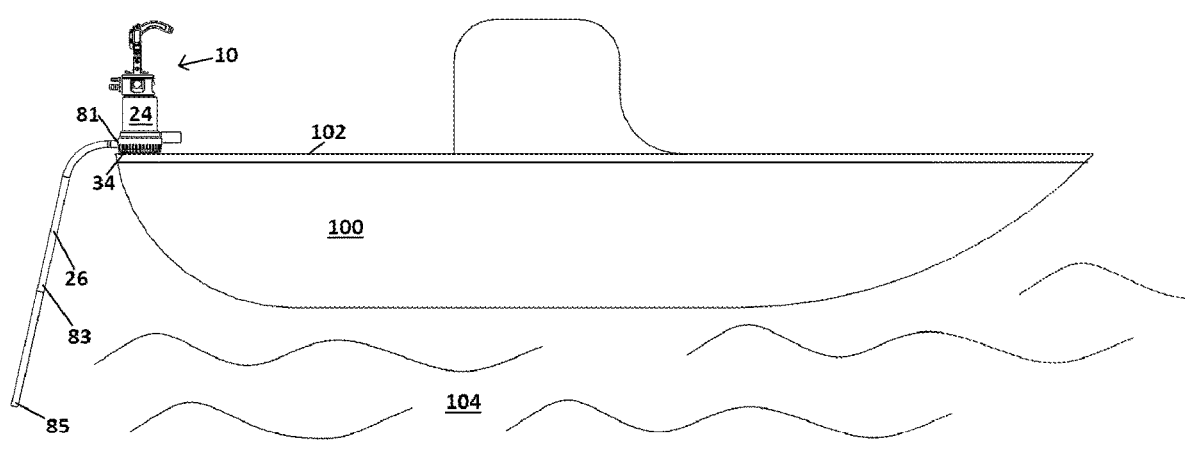
FIG. 4 is a side view of a system of the present invention in situ.

Now referring to FIG. 1B, a diagram of an alternative embodiment of system 10 of the present invention is provided. In this embodiment, water pump 24 is incorporated directly into the other components of system 10. No pump connector 66 is necessary because water pump 24 and spraying device 12 are connected by their proximity to one another. Hose 26 extends from water pump 24 so as to reach the source 104 of water (as shown in FIGS. 1C and 4, for examples).

Figure 1C:
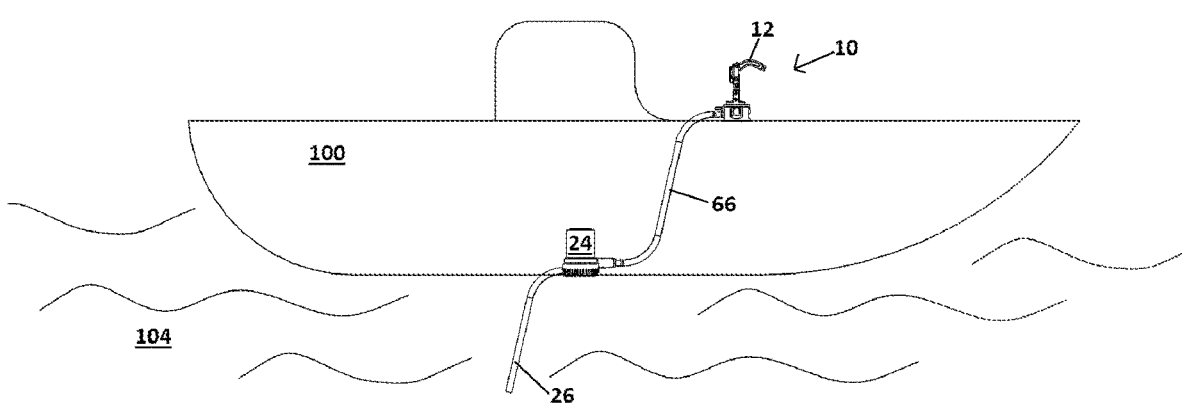
FIG. 1C is a diagram of an embodiment of the system of the present invention where the water pump is incorporated into the boat's bilge pump.

Now referring to FIG. 1C, a diagram of an alternative embodiment of system 10 incorporated into boat 100 is provided. In this embodiment, water pump 24 is the bilge pump of boat 100 or is incorporated into the bilge pump of boat 100. Spraying device 12 is attached to or incorporated into the gunnel of boat 100 and pump connector 66 extends between water pump 24 and spraying device 12. Hose 26 extends from water pump 24 out into the source 104 of water on which boat 100 is floating. The hose shown beneath hose 26 is the hose out of which water will be pumped by the bilge pump. Depending on the sophistication of the bilge pump and water pump 24, a single hose 24 may be used both to suck in water for system 10 and spit out unwanted, as necessary. This embodiment may be built into boat 100 or retrofitted.

Figure 2A:
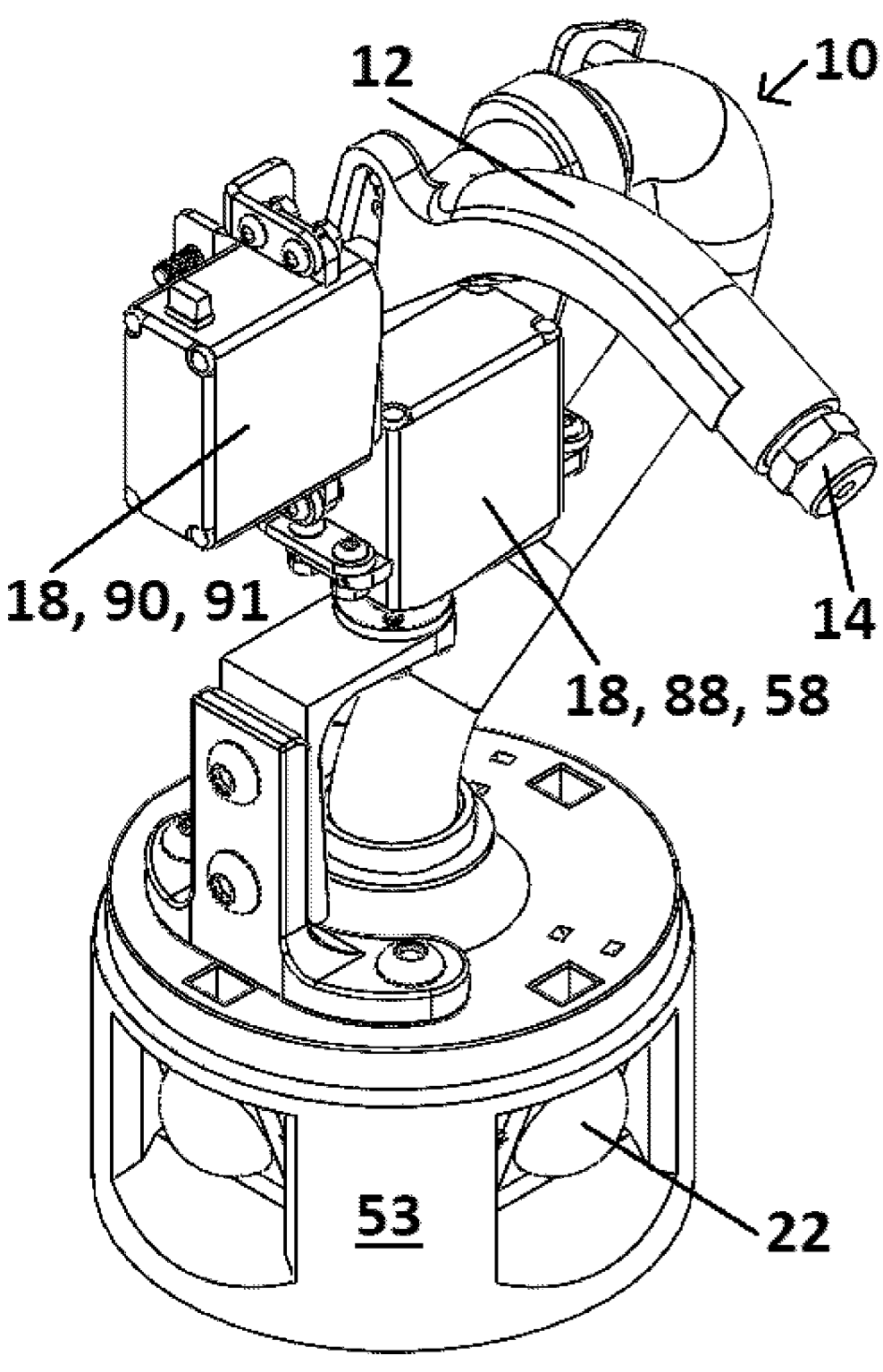
FIG. 2A is a perspective cut away view of some components of one embodiment of the system of the present invention.

Now referring to FIG. 2A, a perspective view of some components of one embodiment of system 10 of the present invention are provided. Certain components, such as water pump 24 and hose 26, are omitted for the purposes of illustration but are understood to be present, as discussed above with reference to FIG. 1. Spraying device 12 ends in nozzle 14 from which water is sprayed. Motion detector 22 is disposed within base 53, but it is understood that motion detector 22 may be successfully configured into system 10 in many ways, within or not within base 53, or otherwise in configurations of system 10 that do not include base 53. As shown, motion detector 22 is three passive infrared (PIR) motion detectors, which together provide approximately 290° of horizontal or lateral view and approximately 90° of vertical view.

System 10 includes means 18 for adjusting a direction of the spray. A first means 18 is means 88 for moving at least nozzle 14 of spraying device 12 through lateral motion 80. These means 88 are lateral actuator 58, which may be an oscillating disc, and they move the entire spraying device 12 from side to side. A second means 18 is means 90 for moving at least nozzle 14 of spraying device 12 through vertical motion 82. These means 90 are vertical actuator 91 and they move nozzle 14 only up and down. Lateral and vertical motion 80, 82 are discussed in more detail below with respect to FIGS. 5A-5F.

Figure 2B:
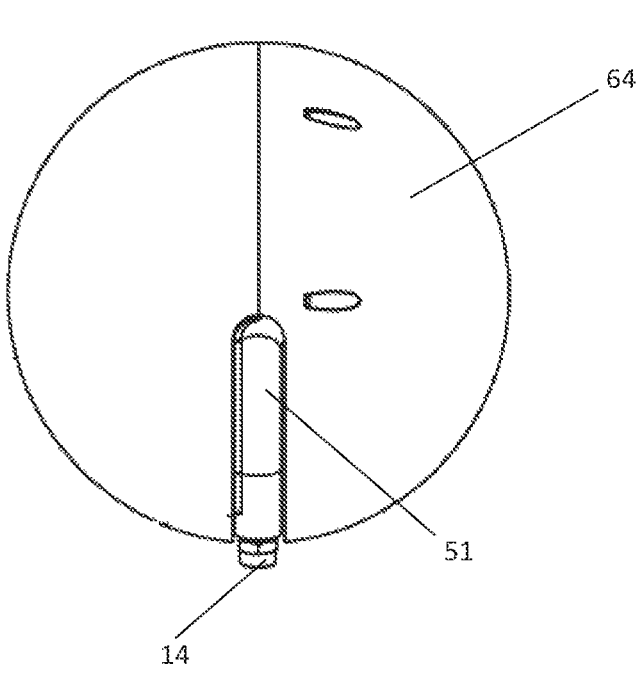
FIGS. 2B and 2C are top down and side views, respectively, of some components of one embodiment of the system of the present invention that includes a housing.
Figure 2C:
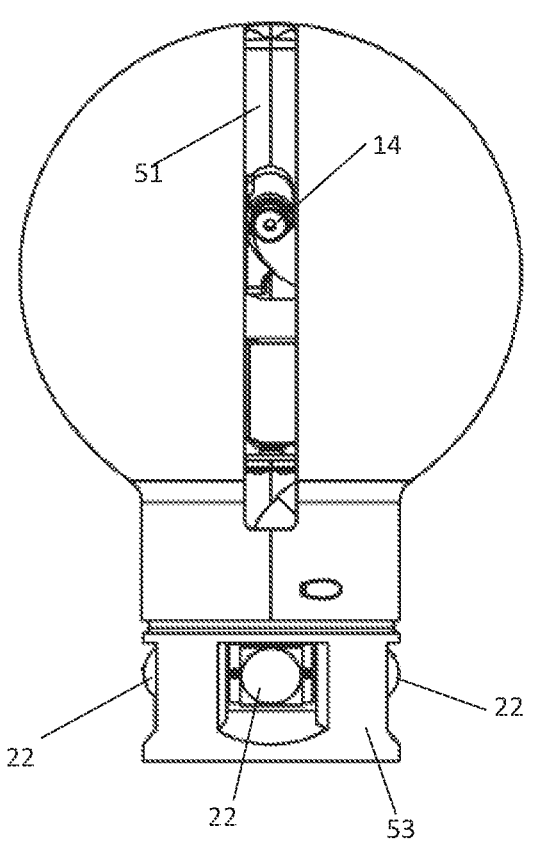

Now referring to FIGS. 2B and 2C, top down and side views, respectively, of some components of one embodiment of the system 10 of the present invention are provided. As in FIG. 2A, certain components are omitted for clarity, but are understood to be as presented with respect to FIG. 1. In this embodiment, system 10 has a round housing 64 having a diameter of approximately 7.5 inches, although the dimensions may be greater or less than 7.5 inches. Housing 64 is attached to base 53. Housing 64 includes slot 51 through which nozzle 14 extends. Slot 51 is long enough to allow nozzle 14 to move through its full range of vertical motion 82. Spraying device 12 is disposed primarily within housing 64, except that nozzle 14 extends outside of housing 64. Nozzle 14 need not extend outside of housing 64. It only needs to be able to spray out of housing 64. In some embodiments, nozzle 14 may be essentially flush with housing 64, so long as it can spray water out. Each of the three motion detectors 22 are shown in base 53 in FIG. 2C. It is understood that in some embodiments, slot 51 is omitted so that housing 64 is more sealed. As shown in FIG. 2A, lateral actuator 58 moves the entire spraying device 12 and housing 64 from side to side through lateral motion 80 but vertical actuator 91 moves only nozzle 14 up and down through vertical motion 82 through slot 51. In embodiments where slot 51 is omitted, the entire spraying device 12 and housing 64 may also move through vertical motion 82. Although not shown in FIGS. 2A and 2B, it is understood that battery 30 may be disposed within housing 64, which provides an added level of protection from the elements, such as sea water or other corrosive elements.

Figure 3:
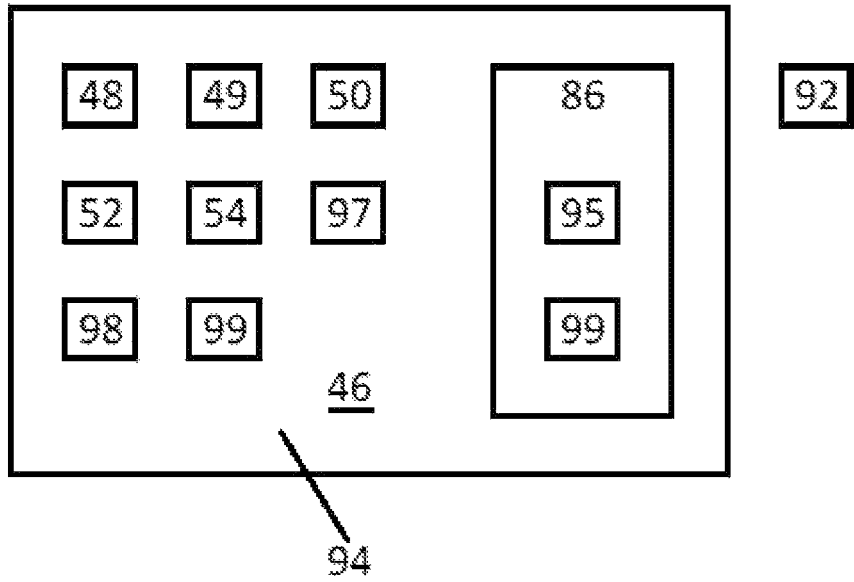
FIG. 3 is a diagram of a control unit of the present invention.

Now referring to FIG. 3, a diagram of a control unit 46 of system 10 is provided. Control unit 46 includes at least a power cycle control 97 for turning system 10 on and off and may also include controls for, the distance that the spraying device will spray water 48; whether pulsation of the spray is used and its frequency and intensity if used 50; force/pressure of the spray 52; and hours of operation of the system 54 or a timer. It is understood that the distance that the spraying device will spray water 48 may be controlled by the direction of the spray, i.e., a combination of the lateral and vertical motion 80, 82 (as described below with respect to FIGS. 5A-5F). Control 48 may control the position of nozzle 14, so that the same circuit coordinates both lateral and vertical positioning. The distance may also be controlled by the force pressure of the spray 52. Control unit 46 also includes a range control 86 that restricts the lateral and vertical motion 80, 82 of the nozzle 14 so that only a specified area is sprayed, as discussed in more detail below. The range control 86 may include separate controls 95, 99 for inputting a range of vertical motion and lateral motion, respectively. Control unit 46 may be controlled by a user interface on a panel 94 somewhere on the body of system 10 or by a remote control 92 or both. Although FIG. 3 is a block diagram illustrating functionality of control unit 46, a panel 94 could resemble such a black diagram as far as each function having a separate control. Some embodiments of system 10 include a battery level detector 96 that monitors the level of battery 30. In such embodiments, control unit 46 may include a function 98 that turns off system 10 when the battery level is less than a designated level. Control unit 46 may include a motion sensor signal 49 that is in communication with motion detector 22.

Now referring to FIG. 4, a side view of system 10 in place on boat 100 is provided. System 10 is mounted on railing 102 of boat 100 with mounting system 34. Unlike the embodiments shown in FIG. 1, in this embodiment, water pump 24 is not sitting directly on the water, so this embodiment includes hose 26. Instead, water pump 24 is incorporated directly with the other components of system 10, similar to the embodiment shown in FIG. 1B. Hose 26 has first end attached to water pump 24; second end 85; and length 83 extending between first and second ends 81, 85. When system 10 is in use, second end 85 of hose 26 is positioned in a source 104 of water that will be pumped by water pump 24 and sprayed by spraying device 12. Length 83 of hose 26 is sufficient for second end 85 to reach and be submerged in this source 104 of water.

Figures 5A, 5B, 5C:
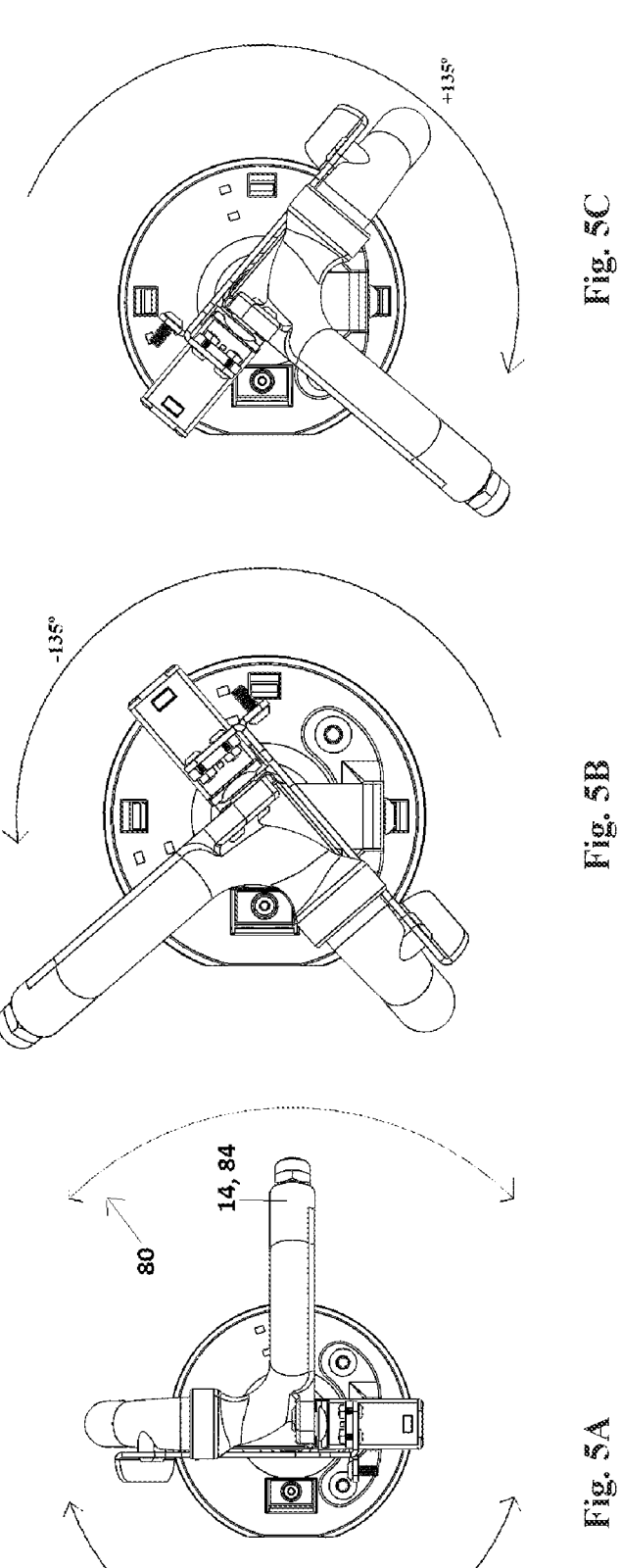
FIGS. 5A-5C are top down diagrams illustrating lateral motion.

Now referring to FIGS. 5A-5C, illustrations of lateral motion 80 are provided. Each of FIGS. 5A-5C is a top down view of system 10 with no housing 64. In FIG. 5A, lateral motion 80 is illustrated in arrows as being a swiveling or side to side motion, relative to the ground on which system 10 is sitting. In FIG. 5A, nozzle 14 is in a start position 84, which is a default position to which nozzle 14 will return when system 10 is not on or when no motion is detected. Some embodiments of system 10 will allow for up to 360° of lateral motion 80, meaning that system 10 may turn in a complete revolution. Although this presents no great engineering challenge, in practice, such a large range is not usually necessary. In light of such practicality, therefore, a practical embodiment moves through approximately 270° of lateral motion 80. This is shown in FIGS. 5B and 5C, with nozzle 14 moving −135° to one side away from starting position 84 in FIG. 5B and +135° to the other side away from starting position 84 in FIG. 5C.

Figure 5F:
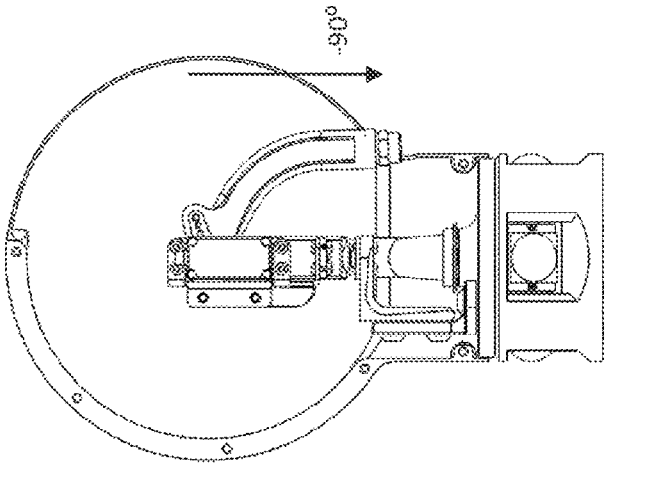
FIGS. 5D-5F are side cut away diagrams illustrating vertical motion.
Figure 5E:
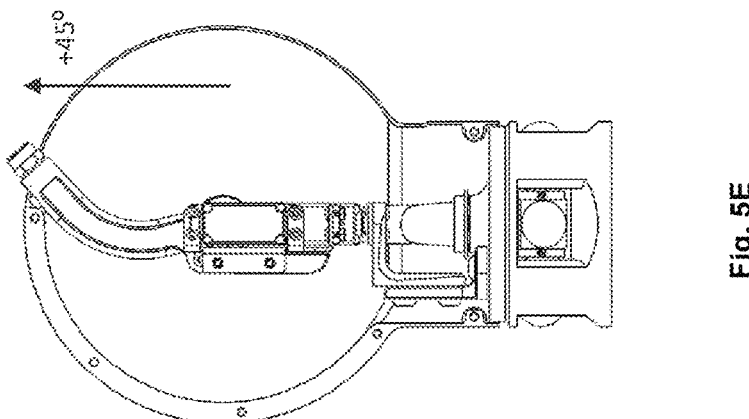
Figure 5D:
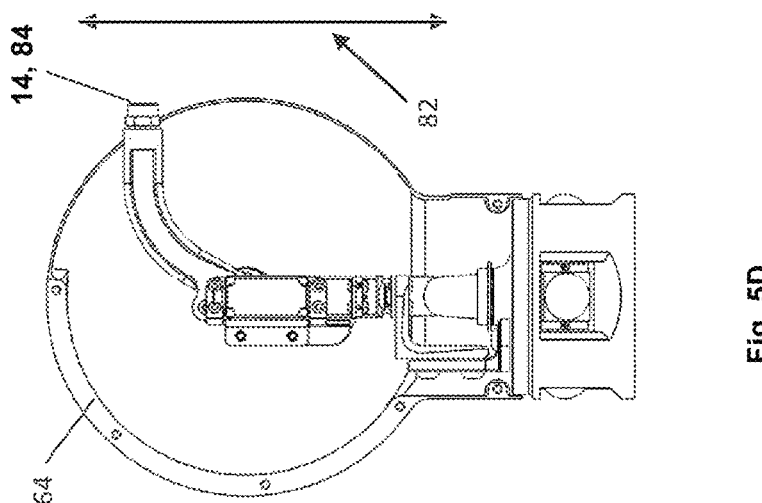

Now referring to FIGS. 5D-5F, illustrations of vertical motion 82 are provided. Each of FIGS. 5D-5F is a (simplified) side cut away view of system 10 with round housing 64 and nozzle 14 of spraying device 12 extending out from housing 64. In FIG. 5D, vertical motion 82 is illustrated in arrows as being up and down motion, relative to the ground on which system 10 is sitting. In FIG. 5D, nozzle 14 is in a start position 84, which is a default position to which nozzle 14 will return when system 10 is not on or when no motion is detected. Some embodiments of system 10 will allow for up to 180° of vertical motion 82, meaning that nozzle 14 may spray straight up in the air or straight down and anywhere in between. Although this presents no great engineering challenge, in practice, such a large range is not usually necessary. In light of such practicality, therefore, one embodiment moves through approximately 135° of vertical motion 82. This is shown in FIGS. 5E and 5F, with nozzle 14 moving +45° up from starting position 84 in FIG. 5D and −90° down from starting position 84 in FIG. 5F.

As discussed above with reference to control unit 46, range control 86 allows for the restriction of the ranges of the lateral and/or vertical motion 80, 82. The user of system 10 may only want the water to spray a specific area, such as a boat deck, and no further (such as the dock beyond the boat). Knowing where the system 10 is placed, the range control 86 allows the lateral motion 80 to be restricted so that spray will go no further than the width of the area to be sprayed and the vertical motion 82 to be restricted so that the spray will go no further than the length of the area to be sprayed.

Figure 6A:
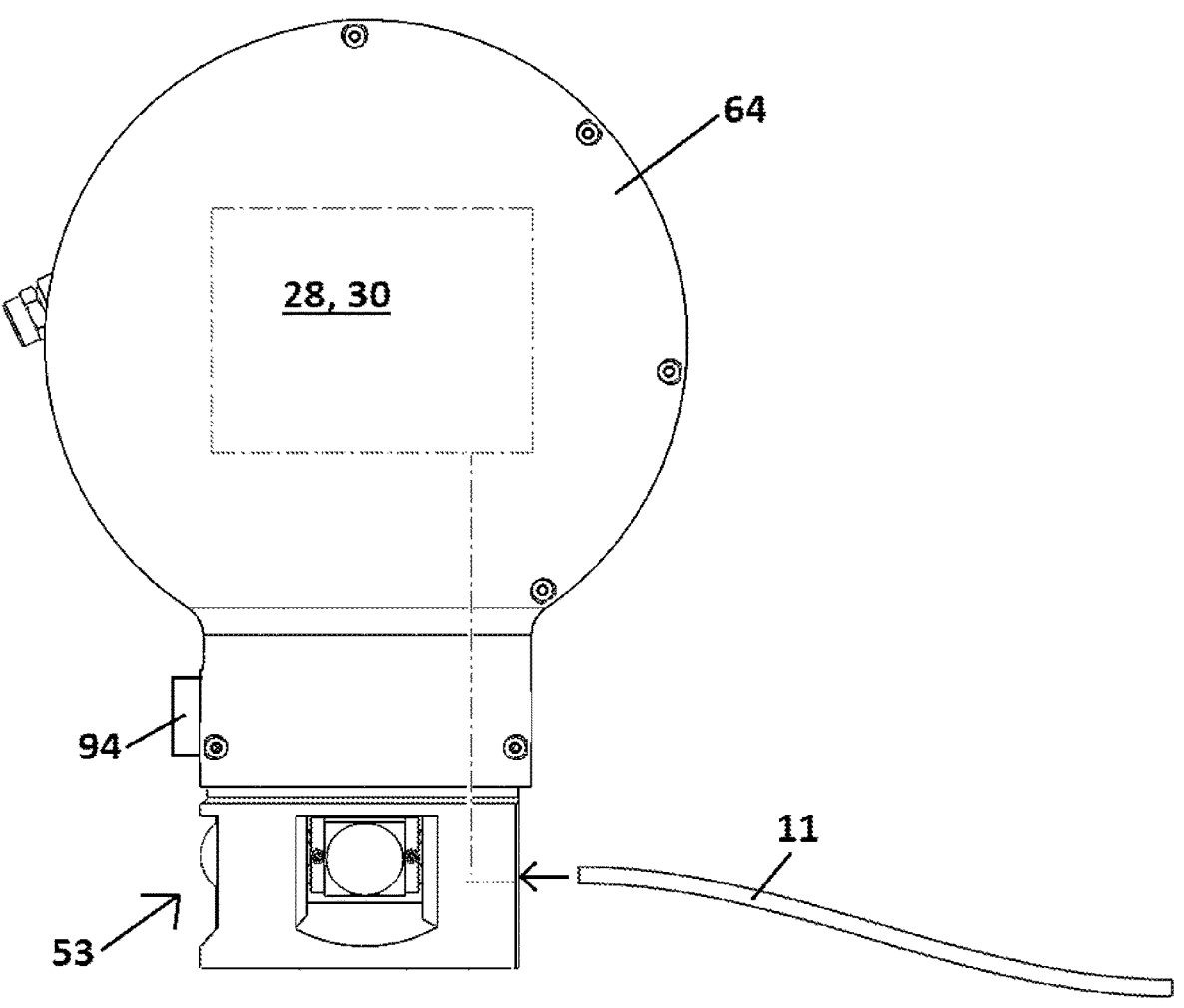
FIGS. 6A-6C are diagrams illustrating variations of the system of the present invention in terms of power source.
Figure 6B:
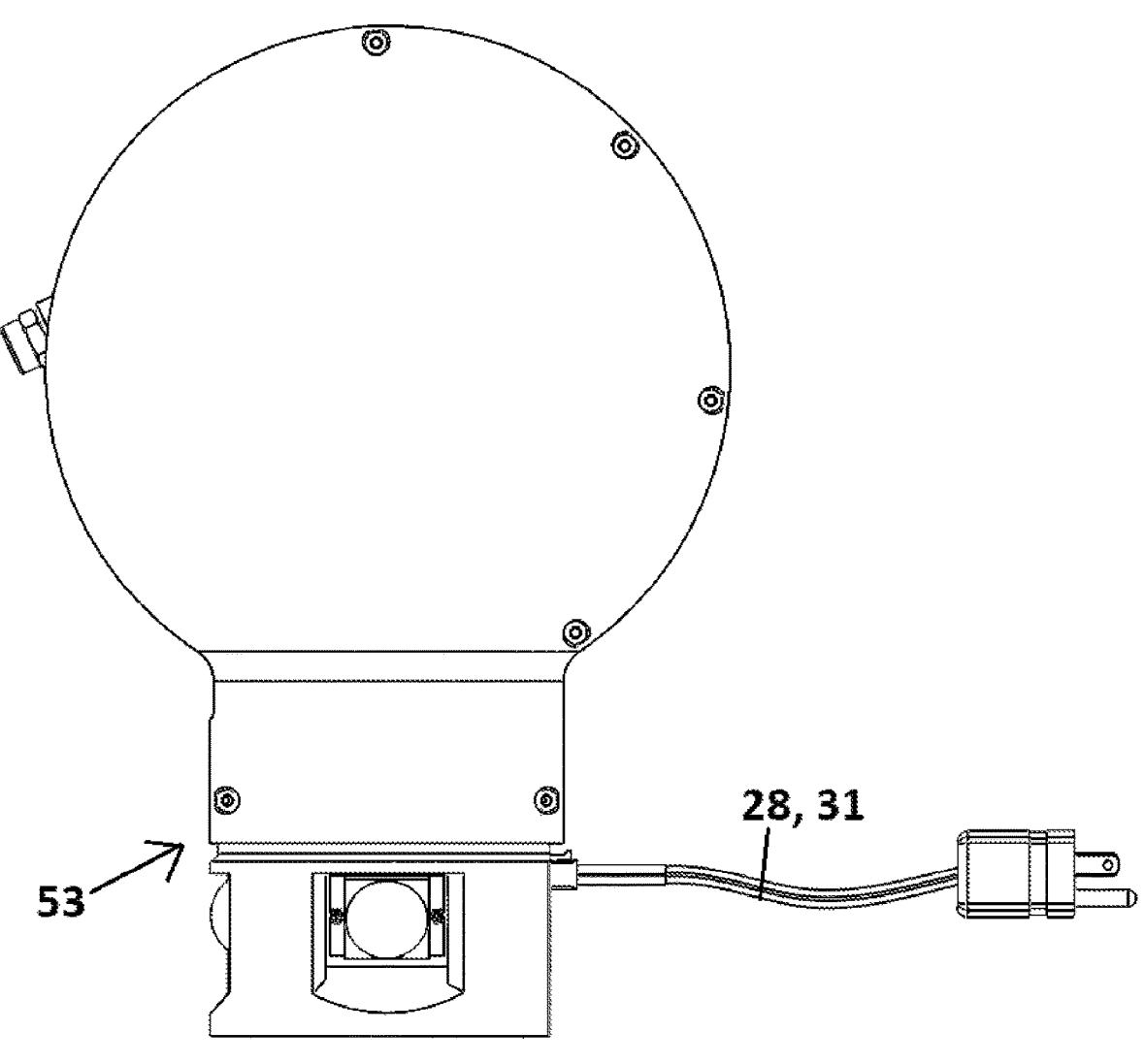
Figure 6C:
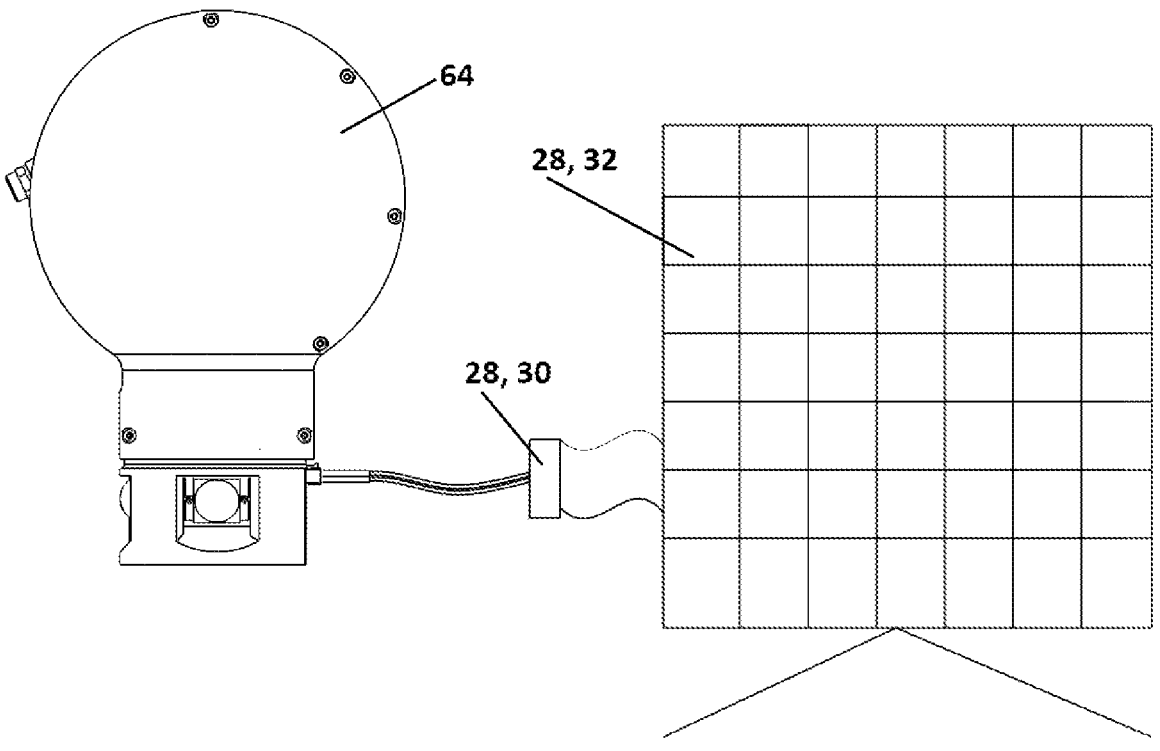

Now referring to FIGS. 6A-6C, diagrams of variations on power source 28 are provided. In FIG. 6A, power source 28 is battery 30 and is shown in dashed lines to be positioned within housing 64. It is understood that battery 30 may also be positioned within base 53 or external to both housing 64 and base 53, as shown in FIG. 6C. Battery 30 is rechargeable and system 10 includes charge cord 11 so as to recharge battery 30. Charge cord 11 may be any commonly used in the art to connect the rechargeable battery 30 with a remote power source so that power from the remote power source will recharge battery 30. It is understood that charge cord 11 may be a charging port into which battery 30 is placed and then plugged directly into an outlet, such that charge cord 11 does not necessarily include a "cord." Panel 94 for control unit 46 is also shown on base 53 as an example. Again, when control unit 46 has a user interface in the form of panel 94 but system 10 includes no base 53, panel 94 may be positioned elsewhere.

In FIG. 6B, power source 28 is power cord 31, which is adapted to mate with a remote power source, such as the boat's battery, the electric grid, or a generator. It is understood that power cord 31 is not a traditional power source, like battery 30 or solar panel 32, but as its inclusion in system 10 facilitates provision of power to system 10, it is considered a type of power source 28 herein. Again, in embodiments of system 10 that do not include base 53, power cord 31 may extend from some other part of system 10.

In FIG. 6C, power source 28 is battery 30 and solar panel 32. As shown, battery 30 is not necessarily disposed within housing 64 or base 53, even when housing 64 or base 53 are included. Also as shown, solar panel 32 may be wired directly to battery 30, in parallel with battery 30 and the rest of the circuit.

Figure 7:
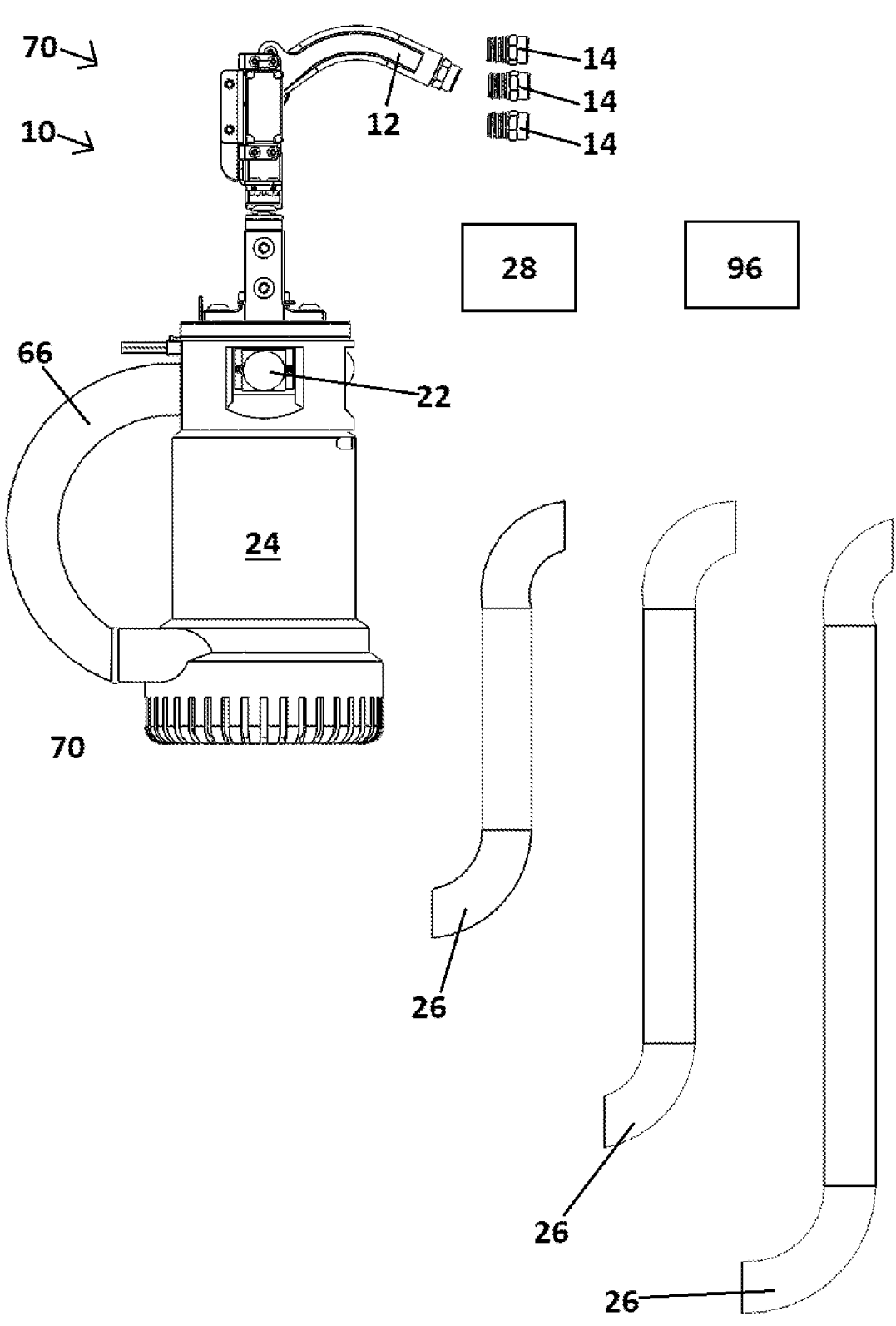
FIG. 7 is a diagram of the components of a kit of the present invention.

Now referring to FIG. 7, a diagram displaying the components of kit 70 is provided. System 10 includes spraying device 12 with removable detachable nozzles 14, motion detector 22, and water pump 24 with removably detachable hoses 26. Kit 70 includes several hoses 26 of different lengths so as to accommodate boats with different freeboards, any of which may be cut to a desired length. Kit 70 may include several nozzles 14 that provide different spray characteristics and may be swapped out depending on the user's preference. Power source 28 may be included in kit 70. Kit 70 may also include battery level detector 96. Battery level detector 96 is primarily used to determine the level of a boat battery. If system 100 is being powered by the boat battery and the battery level is detected to be too low, then the system 10 may be turned off so as to preserve the boat battery's power for essential functions.

The variation of the system 10 is a specific subset of some of the components of system 10. FIG. 2A, which includes spraying device 12, motion detector 22, means 80 for moving the spraying device through lateral motion, means 88 for moving the spraying device through vertical motion 90, illustrates several components of the variation. FIG. 2A does not shown water pump 24, which is appropriate for the variation, which may or may not include a water pump 24. As with system 10, the variation may include any of the power sources 28 discussed above. A version of control unit 46, as diagrammed in FIG. 3, would also be included in the variation. The control unit 46 of the variation would be programmable to allow for input of a range of the lateral and vertical motion of the spray, so it would include controls 95, 99 for inputting a range of vertical motion and lateral motion, respectively.

Figure 8A:
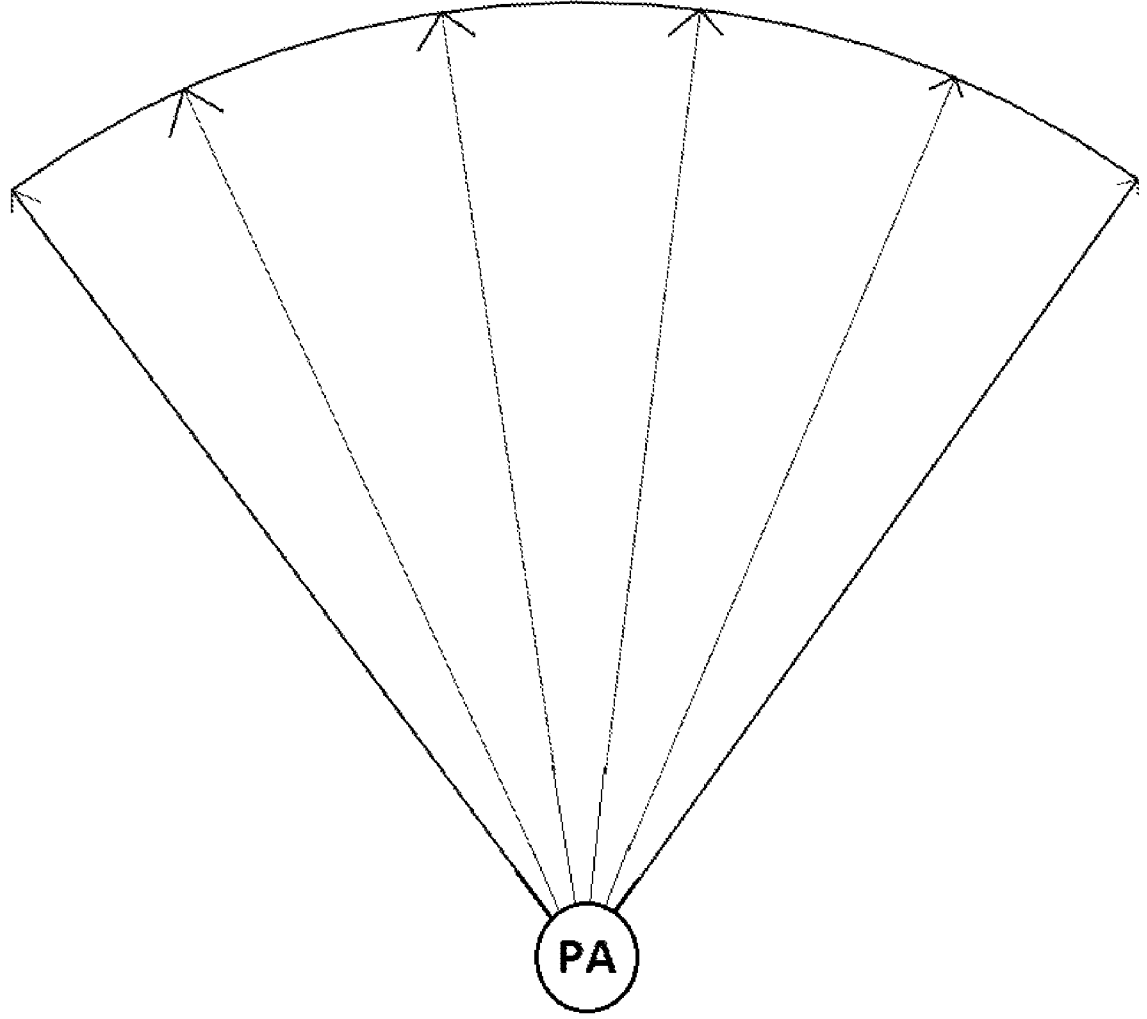
FIG. 8A is a diagram of the spraying capabilities of a prior art motion-detector activated spraying device.

Referring now to FIG. 8A, a diagram illustrating the spraying capabilities of a prior art motion detection-activated spraying device is provided. Prior art device PA can only spray in an arc determined by how far device PA may swivel from side to side or in a single direction. The outer distance for spraying is set so that the spray may reach only as far as the arc and the end of the arrows.

Figure 8B:
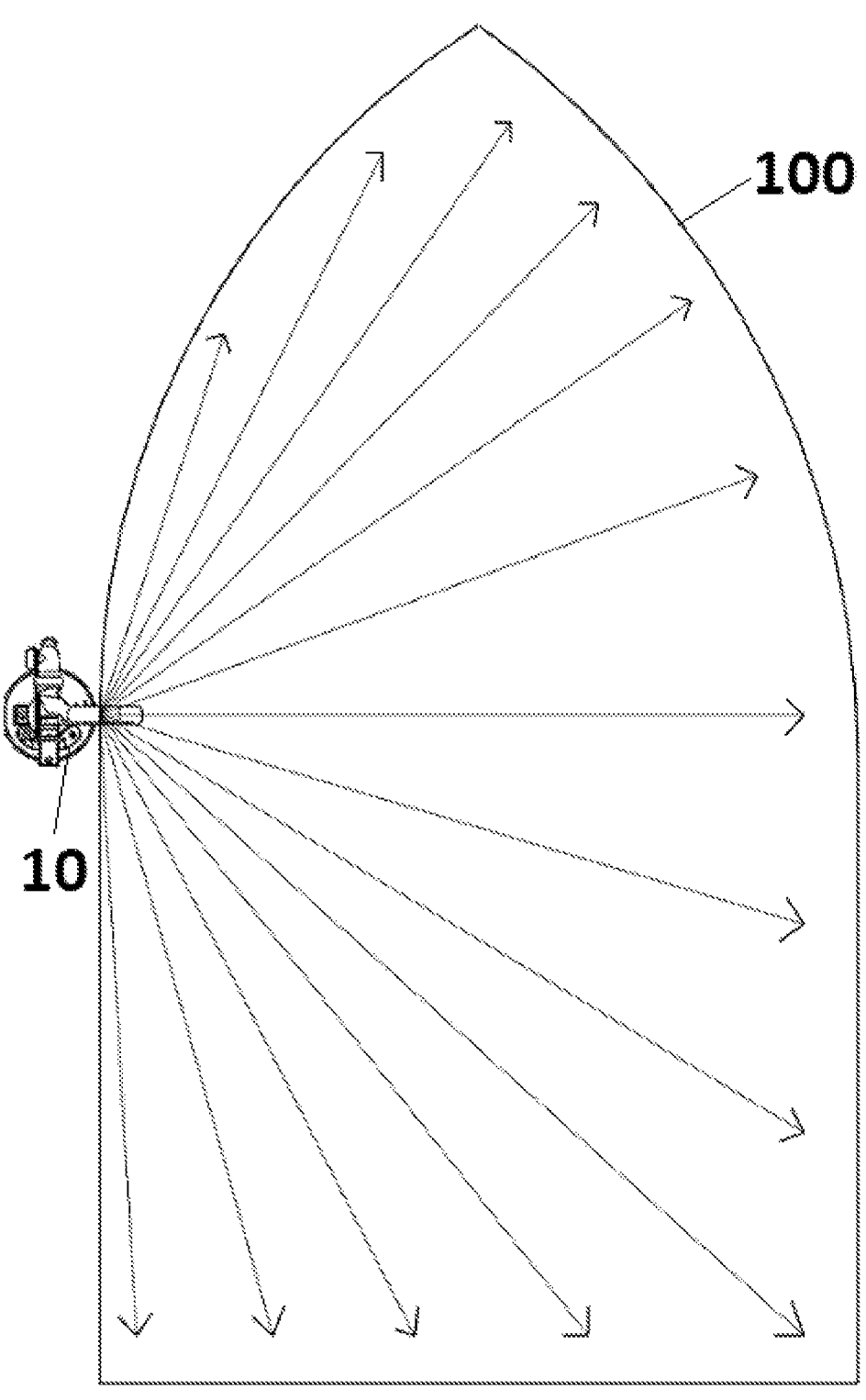
FIG. 8B is a diagram illustrating spraying capabilities of the present invention, regarding programming a specific area to be sprayed.

Referring now to FIG. 8B, a diagram illustrating the spraying capabilities facilitated by the programmable control unit is provided. This programming function allows only a specific area to be sprayed when motion is detected therein. It is understood that this functionality may be incorporated into any embodiment of system 10, but it is required in the variation. Programmable control unit 46, which includes controls 95, 99 for inputting a range of vertical motion and lateral motion, respectively, will allow a specific area to be designated. In FIG. 8B, the specific area of boat 100 has been entered, following the perimeter of boat 100. System 10, which may be the variation, will only spray within that designated area when motion is detected. When motion is detected, system 10 may spray the entire designated area or may spray only in the direction in which motion was detected. Either way, the spray will always be within the designated area. System 10 may draw its water from a pump, as described above with respect to FIGS. 1A-1C, for examples, or from another type of pressurized water source. For example, if boat 100 were tied up at a dock, the pressurized water system might be a hose spigot on the dock.

Figure 8C:
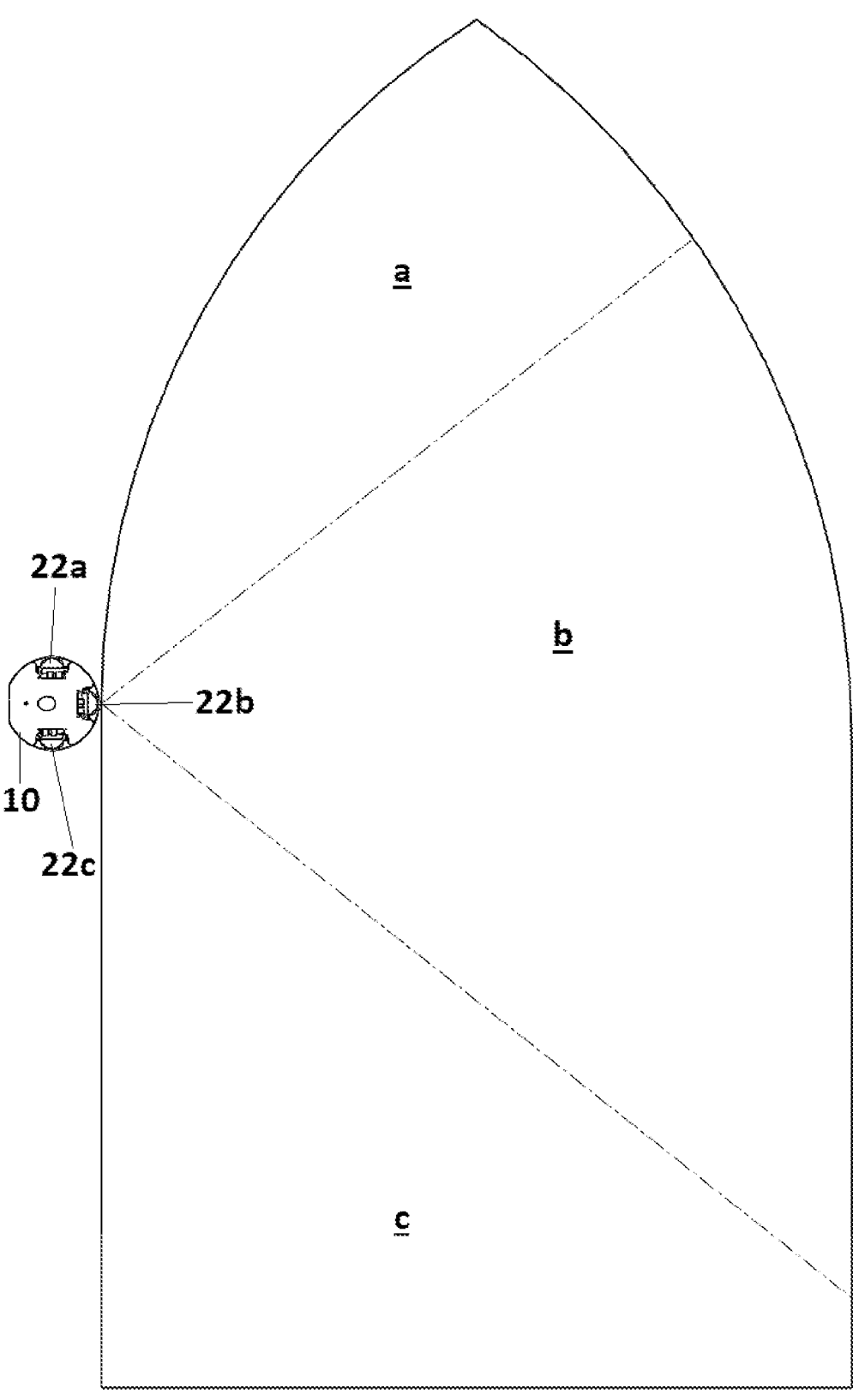
FIG. 8C is a diagram illustrating further spraying capabilities as an alternative to or in addition to those illustrated in FIG. 8B.

Now referring to FIG. 8C, a diagram illustrating further spraying capabilities as an alternative to or in addition to those illustrated in FIG. 8B is provided. In this embodiment, motion detector 22 includes three motion detectors, labeled 22a, 22b, and 22c, facing in different directions. Area a may be programmed in to be sprayed if motion detector 22a detects motion. Area b may be programmed in to be sprayed if motion detector 22b detects motion. Area c may be programmed in to be sprayed if motion detector 22c detects motion. This functionality may be in addition to or instead of the functionality described with respect to FIG. 8B. In embodiments that include both functionalities illustrated in FIGS. 8B and 8C, a user may choose between having the entire area sprayed when motion is detected anywhere within the perimeter of boat 100 (as illustrated in FIG. 8B) or having only the section corresponding to where motion was detected by a specific motion detector 22a, 22b, 22c, as applicable (as illustrated in FIG. 8C). In addition, system 10 may spray only in the single direction where motion was detected, rather than the entire area or a subset of the entire area.

One of at least ordinary skill in the art will recognize that any area may be programmed into the programmable control unit as described above. FIGS. 8B and 8C show a boat shape, but the shape of the area could be any shape and is limited in size only be the maximum distance that the spray may travel. As discussed above, the distance may be affected by the vertical motion, and may be enhanced by additional force of the spray.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A system for repelling birds from a boat, comprising:
   a spraying device comprising a nozzle from which water is sprayed in mechanical communication with a pressurized source of the water;
   at least one motion detector configured to detect the motion of a bird near the boat, said at least one motion detector in communication with said spraying device such that a motion detected by said motion detector causes said spraying device to spray the water from said nozzle;
   a lateral actuator that moves at least said nozzle of said spraying device 360 degrees about a vertical axis of the spraying device;
   a vertical actuator that moves at least said nozzle of said spraying device 180 degrees about a longitudinal axis of the spraying device;
   a programmable control unit comprising at least controls for inputting ranges of motion for the nozzle, such that said programmable control controls at least a range of the direction of the spray; and
   at least one power source in electrical communication with at least:
      said control unit such that said power source provides power to said control unit; and
      said at least one motion detector such that said power source provides power to said at least one motion detector.

2. The system as claimed in claim 1, further comprising a hose, said hose comprising:
   a first end attached to said water pump;
   a second end; and
   a length between said first and second ends, wherein said second end of said hose is positioned in the source of the water and said length is sufficient for said second end to reach the source of the water.

3. The system as claimed in claim 1, further comprising a pump connector that connects said spraying device and said water pump.

4. The system as claimed in claim 1, wherein said power source is at least a battery.

5. The system as claimed in claim 4, wherein said battery is a rechargeable battery and said system further comprises a charge cord for recharging said rechargeable battery.

6. The system as claimed in claim 5, wherein said power source is also at least a solar panel, wherein said solar panel recharges said rechargeable battery.

7. The system as claimed in claim 1, wherein said power source is a power cord adapted to mate with a remote power.

8. The system as claimed in claim 1, further comprising a mounting system for securing said system to a fixed surface.

9. The system as claimed in claim 1, wherein said programmable control unit further controls at least a power cycle control of said system.

10. The system as claimed in claim 9, wherein said power cycle control comprises a timer of operation of said system.

11. The system as claimed in claim 9, further comprising a remote control in communication with said control unit such that said remote control controls said control unit remotely.

12. The system as claimed in claim 1, further comprising a housing that houses at least a portion of said spraying device, such that said nozzle of said spraying device is external from said housing.

13. The system as claimed in claim 1, further comprising a base on which said motion detector is disposed.

14. The system as claimed in claim 1, wherein:
   said motion detector comprises more than one motion detector, wherein each motion detector is disposed to face in a different direction from another motion detector and toward a separate area in which said motion detector detects motion; and
   said controls for inputting ranges of the lateral and vertical motion comprise controls for inputting ranges of the lateral motion of said nozzle and vertical motion as said nozzle for each of said more than one motion detector, such that spray is only directed toward the specific area toward which said motion detector that detected motion in the specific area faces.

15. The system as claimed in claim 1, further comprising a water pump, wherein:

said water pump is in physical communication with the source of water that is pressurized via said water pump;

said water pump is in mechanical communication with said spraying device such that said water pump pumps the water from the source of the water to said spraying device; and said at least one power source is in further electrical communication with said water pump such that said power source provides power to said water pump.

16. The system as claimed in claim 1, wherein the pressurized source of water is provided from and pressurized via a spigot.

17. The system as claimed in claim 1, wherein inputting ranges of the lateral and vertical motion causes said programmable control unit to define and store an area to be sprayed.

18. The system as claimed in claim 1, wherein inputting ranges of the lateral and vertical motion causes said programmable control unit to define and store a shape to be sprayed.

19. The system as claimed in claim 1, wherein said lateral actuator is an oscillating disc.

20. A system for repelling birds from a boat, comprising:

a spraying device comprising a nozzle from which water is sprayed;

a water pump in mechanical communication with said spraying device such that said water pump pumps the water to be sprayed to said spraying device;

a motion detector configured to detect the motion of a bird near the boat, said motion detector in communication with said spraying device such that a motion detected by said motion detector causes said spraying device to spray the water from said nozzle;

a lateral actuator that moves at least said nozzle of said spraying device 360 degrees about a vertical axis of the spraying device;

a vertical actuator that moves at least said nozzle of said spraying device 180 degrees about a longitudinal axis of the spraying device;

at least one power source in electrical communication with at least said water pump, said motion detector, said lateral actuator, and said vertical actuator such that said at least one power source provides power to at least said water pump, said motion detector, said lateral actuator, and said vertical actuator;

a programmable control unit comprising at least controls for inputting ranges of the nozzle, such that said programmable control controls at least a range of the direction of the spray;

a base on which said motion detector is mounted; and a housing attached to said base, wherein said housing houses at least:

said lateral actuator;

said vertical actuator; and said spraying device except for said nozzle of said spraying device, wherein said housing comprises a slot through which said nozzle extends outside of said housing, said slot sized and dimensioned to allow for said vertical motion of said nozzle.

21. The system as claimed in claim 20, further comprising a pump connector that connects said spraying device and said water pump.

22. The system as claimed in claim 20, further comprising a hose, said hose comprising:

a first end attached to said water pump;

a second end; and a length between said first and second ends, wherein said second end of said hose is positioned in the source of the water and said length is sufficient for said second end to reach the source of the water.

23. The system as claimed in claim 20, wherein said housing extends up from said base.

24. The system as claimed in claim 20, wherein said housing is round.

\* \* \* \* \*